US011777479B2

(12) United States Patent
O'Shea et al.

(10) Patent No.: US 11,777,479 B2
(45) Date of Patent: Oct. 3, 2023

(54) CONFIGURATION OF AGGRESSOR INTEGRATED CIRCUIT TO PREVENT SPUR INTERFERENCE AT VICTIM INTEGRATED CIRCUIT

(71) Applicant: Apple Inc., Cupertino, CA (US)

(72) Inventors: Helena Deirdre O'Shea, San Jose, CA (US); Ali Moaz, Bayern (DE); Tim Schoenauer, Bavaria (DE); Rahmi Hezar, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/977,191

(22) Filed: Oct. 31, 2022

(65) Prior Publication Data
US 2023/0073376 A1 Mar. 9, 2023

Related U.S. Application Data

(63) Continuation of application No. 17/469,294, filed on Sep. 8, 2021, now Pat. No. 11,522,531.

(51) Int. Cl.
H03K 5/1252 (2006.01)
G06F 21/71 (2013.01)

(52) U.S. Cl.
CPC .......... H03K 5/1252 (2013.01); G06F 21/71 (2013.01)

(58) Field of Classification Search
CPC .................. H03K 5/1252; G06F 21/71; H04B 2215/064; H04B 3/32; H04W 24/08; H04W 52/243; H04W 72/02; H04W 72/0453

See application file for complete search history.

(56) References Cited

U.S. PATENT DOCUMENTS

2013/0235743 A1* 9/2013 Goldhamer ......... H04W 52/243
370/252

* cited by examiner

Primary Examiner — Jung Kim
(74) Attorney, Agent, or Firm — Sterne, Kessler, Goldstein & Fox P.L.L.C.

(57) ABSTRACT

Embodiments relate to identifying frequencies to be protected at a victim integrated circuit (IC) and sending protection information including the identified frequencies to an aggressor IC. The aggressor IC configures its subsystems or circuits to operate using operating frequencies that prevents spurs that may interfere with the frequencies identified in the protection information. If not all of the frequencies in the protection information can be protected, the aggressor IC selects a subset of the frequencies to be protected. Then, the aggressor IC configures the operating frequencies of its subsystems or circuits so that spurs that they generate do not interfere with the selected frequencies.

18 Claims, 8 Drawing Sheets

| Protection Info | |
|---|---|
| Priority 1 | 1710-1755 (MHz) |
| Priority 2 | 2500-2570 (MHz) |
| Priority 3 | 788-798 (MHz) |
| Priority 4 | 1850-1910 (MHz) |

⋮ ⋮

| Other Info | Transmitted data type, signal strength, active comm. subsystem, etc. |

*FIG. 9*

CONFIGURATION OF AGGRESSOR INTEGRATED CIRCUIT TO PREVENT SPUR INTERFERENCE AT VICTIM INTEGRATED CIRCUIT

CROSS-REFERENCE TO RELATED APPLICATIONS

This application is continuation of U.S. patent application Ser. No. 17/469,294, filed on Sep. 8, 2021 (issued as U.S. Pat. No. 11,522,531 on Dec. 6, 2022), which is incorporated by reference herein in its entirety.

BACKGROUND

1. Field of the Disclosure

The present disclosure relates to configuring the operation of an integrated circuit (IC) chip in an electronic device to prevent spurs generated from its operation from interfering with the operation of another IC in the same electronic device.

2. Description of the Related Art

An electronic device may include circuits for implementing multiple functions and communication standards. Such functions and standards include various wireless communication standards as well as various sensors. Due to a multiplicity of the operating frequencies and the physical proximity between the circuits associated with these functions and standards, spurs generated from a circuit in an electronic device may interfere or disrupt operations of another circuit in the same electronic device. If the spurs fall near the operating frequency of a victim circuit, the spurs may lead to degradation of signal-to-noise ratio (SNR) of signals at the victim circuit and mixing of undesirable noise into the signals. Various techniques ranging from frequency planning to clock spreading have been developed. However, these techniques are sometimes inappropriate to mitigate spurs sufficiently to avoid interference at the victim circuit.

SUMMARY

Embodiments relate to protecting frequencies of use by a first integrated circuit (IC) in an electronic device. The first IC sends protection information to a second IC to configure the operations of the second IC. The protection information indicates frequencies to be protected from spurs for operations of the first IC. The second IC receives the protection information and configures itself to avoid generating spurs that interfere with at least some of the protected frequencies. The first IC generates the protection information by analyzing the operating status of components of the first IC.

BRIEF DESCRIPTION OF THE DRAWINGS

Figure (FIG. 1 is a high-level diagram of an electronic device, according to one embodiment.

FIG. 9 is a diagram illustrating data fields in protection information generated by the victim IC, according to one embodiment.

Figure 1:
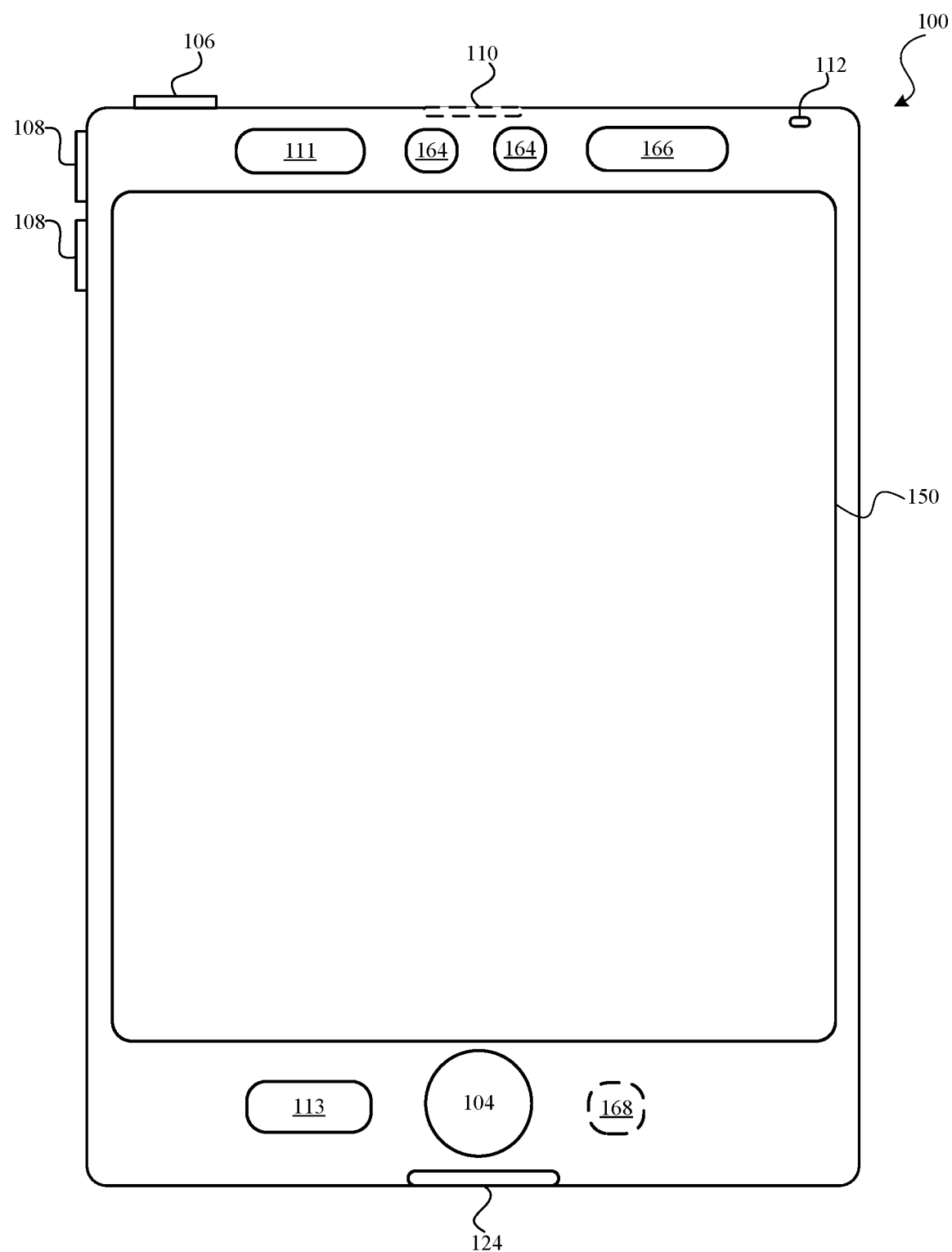

The figures depict, and the detailed description describes various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments relate to identifying frequencies to be protected for the operation of a victim integrated circuit (IC) and sending protection information including the identified frequencies to an aggressor IC. The aggressor IC configures its subsystems or circuits to operate using operating frequencies that prevents spurs that may interfere with the frequencies identified in the protection information. If not all of the frequencies in the protection information can be protected, the aggressor IC selects a subset of the frequencies to be protected by priority of the importance of these frequencies to the functional performance of the victim IC. Then, the aggressor IC configures the operating frequencies of its subsystems or circuits so that spurs that they generate do not interfere with the selected frequencies.

An aggressor IC described herein refers to an IC that generates spurs interfering with the operation of another IC. The spurs may be a function of a local clock signal provided to the aggressor IC.

A victim IC described herein refers to an IC subject to interference by the spurs generated by an aggressor IC. The victim IC may be, for example, a wireless communication system.

Although a victim IC is a counterpart to an aggressor IC, the victim IC and the aggressor IC may be interchanged depending on the operating status of the victim IC and the aggressor IC. That is, the same IC may become a victim IC when experiencing interference from spurs generated by another IC while the same IC may become an aggressor IC when it generates spurs that interfere with the operations of the other IC.

Example Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, Calif. Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

Figure (FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. Device 100 may include more than one type of image sensors 164. Each type may include more than one image sensor 164. For example, one type of image sensors 164 may be cameras and another type of image sensors 164 may be infrared sensors that may be used for face recognition. In addition or alternatively, image sensors 164 may be associated with different lens configuration. For example, device 100 may include rear image sensors, one with a wide-angle lens and another with as a telephoto lens. Device 100 may include components not shown in FIG. 1 such as an ambient light sensor, a dot projector and a flood illuminator.

Device 100 is only one example of an electronic device, and device 100 may have more or fewer components than listed above, some of which may be combined into a component or have a different configuration or arrangement. The various components of device 100 listed above are embodied in hardware, software, firmware or a combination thereof, including one or more signal processing and/or application specific integrated circuits (ASICs). While the components in FIG. 1 are shown as generally located on the same side as touch screen 150, one or more components may also be located on an opposite side of device 100. For example, front side of device 100 may include an infrared image sensor 164 for face recognition and another image sensor 164 as the front camera of device 100. The back side of device 100 may also include additional image sensors 164 as the rear cameras of device 100.

Example System in System Including Multiple ICs

Figure 2:
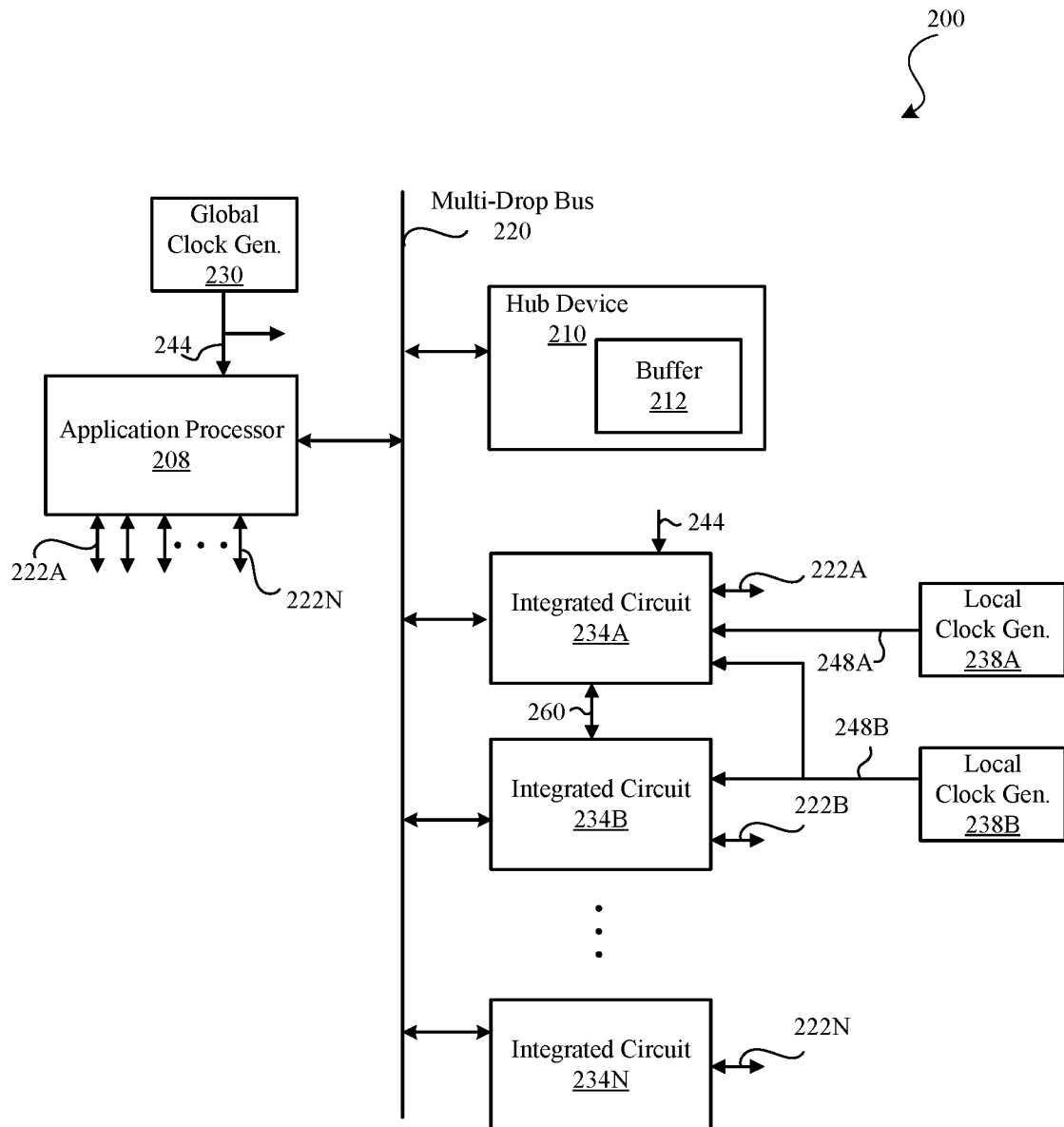
FIG. 2 is a block diagram illustrating a systems of the electronic device including multiple integrated circuits (ICs) communicating over a multi-drop bus, according to one embodiment.

FIG. 2 is a block diagram illustrating a system 200 of electronic device 100 including multiple integrated circuits (ICs) communicating over a multi-drop bus 220, according to one embodiment. Electronic device 100 may include, among other components, an application processor 208 (also referred to as "a central processor"), a hub device 210, ICs 234A through 234N (collectively referred to as "ICs 234" herein), multi-drop bus 220, fabrics 222A through 222N (collectively referred to as "fabrics 222" herein) and local clock generation circuits 238A, 238B. Electronic device 100 may include additional components (e.g., user interfaces) not illustrated in FIG. 2.

Application processor 208 is a processing circuit in electronic device 100 for executing various operations. Application processor 208 may include one or more processing cores for executing various software programs as well as dedicated hardware circuits for performing specialized functions such as processing images, performing security operations, performing machine learning operations, and processing audio signals. Application processor 208 may also execute operations to coordinate the operations of other components in electronic device 100 including hub device 210 and ICs 234. Application processor 208 may comprise firmware or hardware for the end-to-end functional behavior of a given IC. For example, IC 234B may not be fully independent, and IC 234B may rely on application processor 208 to coordinate its operation with other ICs, e.g., IC 234A. Application processor 208 may also incorporate one or more components (e.g., cellular modem) that may also be embodied as a separate IC.

Hub device 210 is hardware, software firmware or a combination thereof, that coordinates the operations of multiple ICs 234 and related components in electronic device 100. For this purpose, hub device 210 may store and execute an operation policy for defining and/or coordinating the operations of the ICs 234 and the related components. By locally coordinating operations of ICs instead of relying upon application processor 208, application processor 208 may be retained in the low power mode for a longer time despite activities in system 200, and also free the resources of application processor 208 during its high-power mode. Hub device 210 may include, among other components, buffer 212 that stores states of ICs 234 or messages to be interchanged between ICs 234. When ICs 234 wake up from a sleep mode, ICs 234 may retrieve relevant state information and/or messages from buffer 212 via multi-drop bus 220. Although not illustrated in FIG. 2, hub device 210 may also control the operations or access to one or more antennas, RF switches, shared/co-dependent RF components or sensors (not shown) associated with system 200.

Each of ICs 234 is a circuit that, by itself or in conjunction with software or firmware, performs specified operations. The specified operations include, for example, implementing wired or wireless communication protocol, processing sensor signals, and performing specialized computing operations. At least a portion of the firmware and/or software for a behavior of any of ICs 234 may reside, e.g., on application processor 208 due to the complexity of interactions with other components on multi-drop bus 220. A pair of ICs (e.g., IC 234A and IC 234B) may communicate through a point-to-point communication channel 260 or a general-purpose input/output set of (GPIOs) (not shown) to mitigate or cancel spurs from one IC (e.g., 234B) from interfering with the operation of another IC (e.g., 234A). In the example described below with reference to FIGS. 3 and 4, IC 234A is a victim IC that mitigates or cancels spurs generated by IC 234B, which functions as an aggressor IC.

Fabrics 222 are communication channels enabling components in the communication system to communicate with application processor 208. One or more of fabrics 222 may be embodied as point-to-point connections such as Peripheral Component Interconnect Express (PCIe), I2C, Serial Peripheral Interface (SPI), Universal Asynchronous Receiver Transmitter (UART) connection, or some other point-to-point connection. As illustrated in FIG. 2, ICs 234A through 234N communicate with application processor 208 via corresponding fabrics 222A through 222N. One or more of fabrics 222 may have high bandwidth and low latency compared to multi-drop bus 220. Fabrics 222 illustrated in FIG. 2 may be physically separate communication channel or one or more shared physical channels with multiple logical sub-channels.

Multi-drop bus 220 is a communication channel that enables multiple components of system 200 to communicate over a shared connection. Multi-drop bus 220 may be used primarily to transmit messages between components in system 200. However, multi-drop bus 220 may also transmit other types of signals. Further, multi-drop bus 220 may be divided into more buses. In one or more embodiments, System Power Management Interface (SPMI) is used to embody multi-drop bus 220. Other serial bus interfaces such as I2C may be used instead of the SPMI to embody multi-drop bus 220.

Global clock generation circuit 230 is a circuit that generates a global clock signal 244 for coordinating the operations across different components in system 200. Global clock signal 244 may be provided to, for example, application processor 208 and IC 234B to coordinate activities. Messages may be communicated between components of system 200 to indicate timing in terms of clock cycles of global clock signal 244.

Local clock generation circuit 238A is a circuit that generates local clock signal 248A to synchronize the operation of IC 234A. Although local clock generation circuit 234A is illustrated in FIG. 2 as being a component separate from IC 234A, local clock generation circuit 234A may be included within IC 234A. In one or more embodiments, local clock signal 248A has a higher frequency than that of global clock signal 244.

Similarly, local clock generation circuit 238A generates local clock signal 248B to synchronize the operation of IC 234B. Local clock generation circuit 234B may also be included within IC 234B. Local clock signal 248B is also provided to IC 234A so that IC 234A can perform spur cancellation on spurs generated by IC 234B, as described below in detail with reference to FIG. 3. In one or more embodiments, local clock signal 248B has a higher frequency than that of global clock signal 244.

Although aggressor IC 234B and victim IC 234A are illustrated as being connected to multi-drop bus 220, one or both of aggressor IC 234B and victim IC 234A may not be connected to multi-drop bus 220. One or more ICs not connected to multi-drop bus 220 may communicate, for example, via another IC (e.g., application processor 208).

Example Architecture of Victim IC

Figure 3:
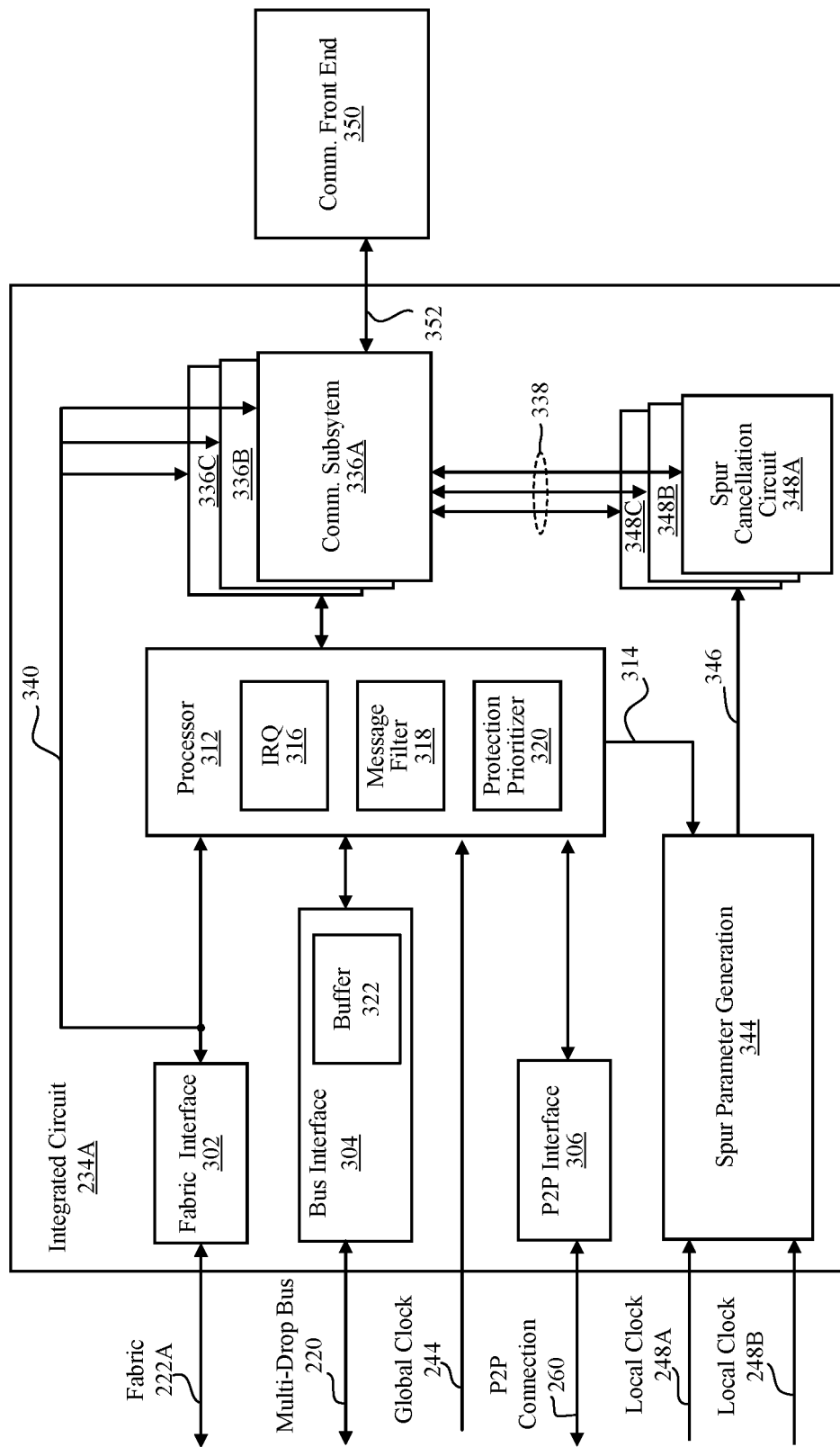
FIG. 3 is a block diagram illustrating a victim IC performing spur cancellation, according to one embodiment.

FIG. 3 is a block diagram illustrating IC 234A that performs spur cancellation on spurs generated by IC 234B, according to one embodiment. In other words, IC 234A is the victim IC, and IC 234B is the aggressor IC. IC 234A is, for example, a communication IC that performs communication with another electronic device using wireless communication protocols such as a mobile communication standard and/or wireless network protocols. In other embodiments, the victim IC may be an IC that performs other functions such as processing sensor signals.

To execute one or more communication protocols, IC 234A may include communication subsystems 336A, 336B, 336C (collectively referred to as "communication subsystems 336"). Although only three communication subsystems 336A, 336B, 336C are illustrated in FIG. 3, more than three communication subsystems or fewer than three communication subsystems may be included in IC 234A. Each of communication subsystems 336 may be associated with different communication protocols, or they may be associated with the same communication protocol. Communication subsystems 336 may receive configuration signals from application processor 208 via fabric interface 302 and line 340. The configuration signals enable application processor 208 to configure the operations of communication subsystems 336 directly without involving processor 312. The communication subsystems 336 interacts with communication front end 350 via connection 352. In one or more embodiments, the communication front end 350 is a RF front end that provides a digital version of a RF signal to one or more of the communication subsystems 336.

IC 234A also includes spur cancellation circuits 348A through 348C (collectively referred to as "spur cancellation circuits 348") for performing spur cancellation. A spur cancellation circuit may function as a notch filter having a notch frequency and/or a notch bandwidth that are adjustable according to spur parameters 346. Each of the communication subsystems 336 may be paired with a corresponding spur cancellation circuit 348 to perform spur cancellation on communication signals received via connection 352. The operation of IC 234B, acting as the aggressor IC, dynamically changes with the progress of time. Such dynamic changes may accompany changes in the operating frequencies of IC 234B. Hence, one or more of spur cancellation circuits 348 are configured via spur parameter 346 to adjust their operations in accordance with the dynamic change in the operating frequencies of IC 234B, as described below in detail with reference to FIGS. 5A and 5B. In one or more embodiments, spur cancellation circuits 348 may be embodied as a digital signal processing (DSP) circuit, as well known in the art.

IC 234A may include interface circuits for communicating with other components of system 200. Such interface circuits may include, for example, fabric interface 302, bus interface 304, and point-to-point (P2P) interface 306. Bus interface 304 is a circuit that, by itself or in conjunction with software or hardware, enables components of IC 234A to communicate with hub device 210 and other ICs 234B through 234N over multi-drop bus 220. In one or more embodiments, bus interface 304 includes a buffer 322 for storing messages over multi-drop bus 220. Buffer 322 remains active to store inbound messages even when other components (e.g., processor 312 and communication subsystems 336) of IC 234A are in a sleep mode, and makes the stored messages available to the communication subsystems 336, when they wake up from the sleep mode. Such buffer 322 may be used in addition to or in lieu of buffer 212 in hub device 210 to enable IC 234B to communicate at any time with IC 234A.

Fabric interface 302 is a circuit that, by itself or in conjunction with software or hardware, enables components of IC 234A to communicate with application processor 208 over fabric 222A. The communication of fabric interface 302 is capable of transmitting data at a faster speed and higher bandwidth than the communication over bus interface 304.

P2P interface 306 is a circuit that, by itself or in conjunction with software or hardware, enables processor 312 to communicate with another IC (e.g., IC 234B) over P2P connection 260. P2P interface 306 may be embodied, for example, by PCIe. P2P interface 306 may be used to receive or transmit information that is time-sensitive. In other embodiments, P2P interface 306 may be replaced with a direct connection such as general purpose input/output (GPIO).

In addition, IC 234B may include, among other components, processor 312 and spur parameter generation circuit 344. Processor 312 is a circuit that manages overall operation of IC 234A. Processor 412 may include, among others, an interrupt manager 316, a message filter 318 and a protection prioritizer 320 as software or hardware components for, e.g., identifying which incoming messages apply for the current operating conditions of IC 234A, along with running the wireless communications protocol software. Interrupt manager 316 is a hardware, software, firmware or a combination thereof that manages interrupts. When interrupt manager 316 receives a message (e.g., via multi-drop bus 220) including an interrupt, interrupt manager 316 extracts the interrupt and sends out one or more interrupt signals to communication subsystem 336. Interrupt signals can cause communication subsystem 336 to shut down, power down a subset of its components, wake-up from a power down mode or indicate real time state of components on multi-drop bus 220.

Message filter 318 is hardware, software, firmware or a combination thereof that receives inbound messages from multi-drop bus 220 via bus interface 304, filters inbound messages for relevancy before sending filtered messages to communication subsystem 336. If an inbound message includes an interrupt, message filter 318 sends the corresponding message to interrupt manager 316.

Processor 312 also receives global clock signal 244 from global clock generation circuit 230. Global clock signal 244 may be used to synchronize the timing of operations in IC 234A with other components (e.g., application processor 208, hub device 210, and ICs 234B through 234N) of system 200. In one or more embodiments, global clock signal 244 is used by processor 312 for determining the start time or update times of operations at IC 234B. Specifically, processor 312 may analyze operation information of IC 234B received over multi-drop bus 220 or P2P connection 260, determine the times when spurs will start occurring or when the characteristics (e.g., frequencies) of the spurs will change (as described below in detail with reference to FIGS. 5A and 5B), convert such times in terms of a local clock as represented by local clock signal 248A, and include timing information in operation information 314 sent to spur parameter generation circuit 344.

Protection prioritizer 320 is hardware, software, firmware or a combination thereof for generating protection information for sending to an aggressor IC (e.g., IC 234B). Protection prioritizer 320 determines the operating status of communication subsystems 336, including bands of frequencies to be protected for an effective operation of communication subsystems 336 and other information such as types of data being transmitted by certain bands of frequencies, signal strength of signals transmitted over the frequencies, and active/inactive states of communication subsystems 336, as described below in detail with reference to FIG. 9. Such information is included in the protection information. The protection information is sent to IC 234B over P2P connection 260 or multi-drop bus 220 so that IC 234B may configure its operation so that spurs interfering with the operation of IC 234A can be mitigated or removed. Alternatively, the protection information may be sent over fabric 222A to application processor 208, if IC 234B is controlled by software executed on application processor 208.

Spur parameter generation circuit 344 is hardware, software, firmware or a combination thereof for generating spur parameters 346 used for configuring spur cancellation circuits 348. To generate the spur parameters, spur parameter generation circuit 344 receives operation information 314 and local clock signals 248A, 248B Then, spur parameter generation circuit 344 replicates the possible locations of spurs using operation information 314 and the frequency relationships of local clocks 248A, 248B. Based on the possible locations of spurs, spur parameter generation circuit 344 identifies whether RF operating channels of communication subsystems 336 are subject to interference. Spur parameters 346 indicate the frequencies of the spurs, whereas messages indicated over multi-drop bus 220 indicates the timing when the spurs will be active. The details of the function of spur parameter generation circuit 344 are described below in detail with reference to FIGS. 5A, 5B and 6.

Example Architecture of Aggressor IC

Figure 4:
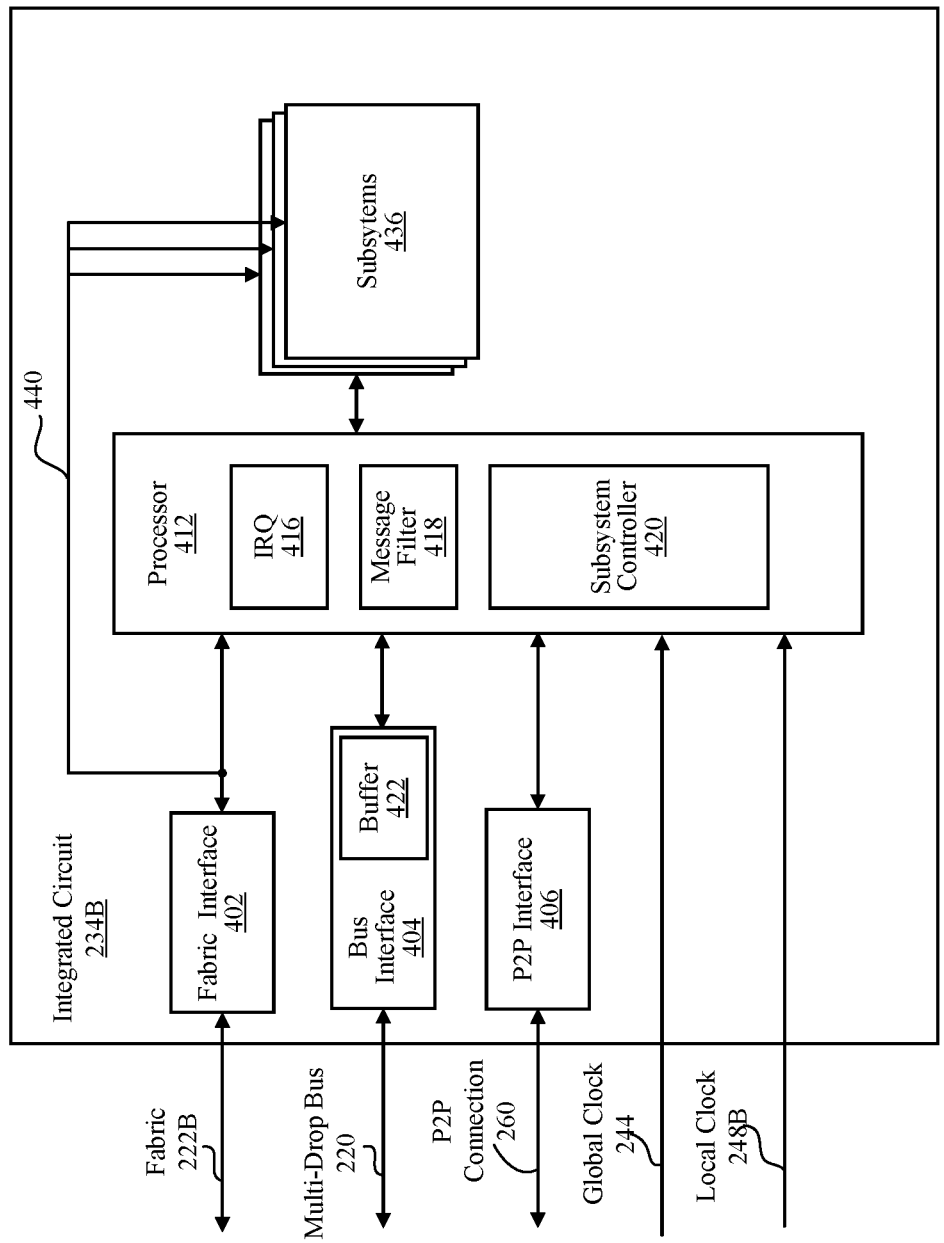
FIG. 4 is a block diagram of an aggressor IC that dynamically changes its operating frequencies, according to one embodiment.

FIG. 4 is a block diagram of IC 234B that generates spurs, according to one embodiment. IC 234B may include, among other components, processor 412, subsystems 436 and various interfacing circuits (e.g., fabric interface 402, bus interface 404, and P2P interface 406). In one or more embodiments, IC 234B is a circuit for operating a sensor such as a Lidar system. In other embodiments, IC 234B is a circuit implementing a wireless communication protocol such as Bluetooth. Bus interface 404 may include buffer 422 that has the same function as buffer 322.

Subsystems 436 include circuits for performing various operations such as sensing or communication. As a result of their operations, one or more of subsystems 436 generate spurs that may interfere with the operations of IC 234A. One or more of subsystems 436 change their operating frequencies and/or timing dynamically in a predetermined manner, and hence, also changes the characteristics of the spurs in a predictable way.

Processor 412 is a circuit that manages the overall operations of IC 234B. Processor 412 may include, among other components, interrupt manager 416, message filter 418 and subsystem controller 420. The functions and operations of interrupt manager 416 and message filter 418 are the same as interrupt manager 316 and message filter 318 of FIG. 3, respectively, and therefore, detailed explanation thereof is omitted herein for the sake of brevity. Subsystem controller 420, after receiving priority information from IC 234A, may configure one or more of subsystems 436 to mitigate or prevent spurs they generate from interfering with prioritized or selected frequencies associated with IC 234A, as described below in detail with reference to FIG. 9. In one or more embodiments, IC 234B also receives protection information from ICs other than 234A. The protection information received from other ICs may indicate frequencies to be protected for the sake of operations of the other ICs. Subsystem controller 420 may include an algorithm to determine the configuration or operating parameters of the one or more subsystems 436 by taking into account protection information received from different sources. The algorithm may, for example, give wight to ICs or frequencies that are given higher priority. The configurations of one or more subsystems 436 by processor 412 according to the priority information may be used in addition to or in lieu of spur cancellation at IC 234A.

Processor 412 may also generate an outgoing message including operation information indicating, among others, a start time or update times of operations at subsystems 436 that are associated with generation of spurs, as described below in detail with reference to FIG. 5. The outgoing message may be sent to IC 234A via multi-drop bus 220 or P2P connection 260. The start time or update times may be expressed in terms of a global time indicated by global clock signal 244. For this purpose, processor 412 receives local clock signal 248B as well as global clock 244. In one or more embodiments, the outgoing message including the operation information may be sent to hub device 210 for storing in buffer 212. The operation information may be subsequently retrieved by IC 234A from buffer 212, for example, after IC 234A wakes up from a sleep mode.

Subsystems 436 are hardware, software, firmware or a combination thereof for performing various operations. Such operations may include controlling of a sensor (e.g., Lidar), and processing signals for wireless communication (e.g., Bluetooth). Each of subsystems 436 may operate in conjunction with each other or independently of each other. In some embodiments, at least one of subsystems 436 operates in a repeating sequence of different intervals and/or be placed in a sleep mode between intervals, as described below in detail with reference to FIGS. 5A and 5B. The subsystems 436 may be configured by subsystem controller 420 or by a control command received from another component of system 200 received via fabric interface 402 and line 440. Although IC 234B is described as including multiple subsystems 436, IC 234B may include only a single subsystem.

Example Operation of Generating Spur Parameter

Spur parameter generation circuit 344 generates spur parameters 346 to account for dynamic changes in the operations of IC 234B. Further, spur parameter generation circuit 344 may also account for drifts in frequencies of local clock signals 248A, 248B when generating spur parameters 346. Accordingly, spur cancellation circuits 348 may be configured by spur parameters 346 to effectively mitigate or cancel the spurs generated by IC 234B despite changes in the operating conditions of IC 234B and/or frequencies of local clock signals 248A, 248B.

Figure 5A:
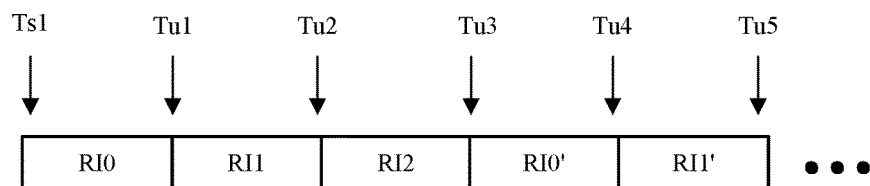
FIGS. 5A and 5B are timing diagrams illustrating a repeating sequence of intervals with different operating frequencies in the aggressor IC, according to one embodiment.

FIG. 5A is a timing diagram illustrating a repeating sequence of intervals with different operating frequencies in one or more subsystems 436 of IC 234B, according to one embodiment. In the example of FIG. 5A, the one or more subsystems repeat a sequence of three intervals (e.g., RI0, RI1, RI2) followed by another sequence of three intervals (e.g., RI0', RI1', RI2'). The corresponding intervals in the sequences may have the same operating frequency. That is, intervals RI0 and RI0', RI1 and RI1', RI2 and RI2' may have the same operating frequencies. In one or more embodiments with fixed lengths of the intervals, spur parameter generation circuit 344 may be provided with start time Ts1 of the first interval RI0 so that spur parameter generation circuit 344 may estimate subsequent update times Tu1 through Tu5 at which the operating frequencies are updated at IC 234B by adding the fixed lengths of the intervals to start time Ts1. If the lengths of intervals are variable, update times (e.g., Tu1 through Tu5) may be provided in addition to start time Ts1 to spur parameter generation circuit 344 to enable spur parameter generation circuit 344 to identify the update times. Alternatively, information on the varying lengths of intervals may be provided to spur parameter generation circuit 344 so that the update times (e.g., Tu1 through Tu5) can be derived from start time Ts1.

Information about timing of the intervals (e.g., start time Ts1, update times Tu1 through Tu5 and lengths of intervals) may be included in operation information 314. In one or more embodiments, operation information 314 may be received from IC 234B via multi-drop bus 220 or P2P connection 260. That is, operation information 314 may be included in a message from IC 234B, which is filtered and decoded at message filter 318 to extract operation information 314. Alternatively, operation information 314 may be received from hub device 210 or application processor 208 via multi-drop bus 220 or fabric 222A. In yet other embodiments, part of operation information 314 (e.g., start time) may be received from IC 234A while the remaining part of operation information 314 (e.g., lengths of intervals) may be received from hub device 210.

Information about the repeating sequence of intervals, their operating frequencies and/or start/update times may be received in a single or multiple messages at IC 234A. The message may be received directly from IC 234B or received via buffer 212 of hub device 210 that temporarily stores the message. In one or more embodiments, buffer 212 may store the sequence of intervals and related information and send a message including such information to IC 234A at a time over multi-drop bus 220 according to a collision detection and avoidance scheme.

Figure 5B:
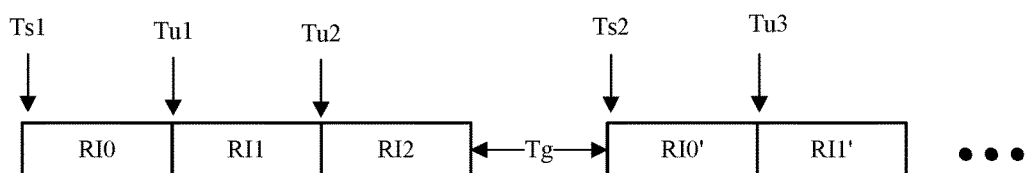

FIG. 5B is a timing diagram illustrating a repeating sequence of intervals when IC 234B is placed in a sleep mode during gap period Tg, according to one embodiment. In such embodiment, the spur parameter generation circuit 344 may be provided with second start time Ts2 after returning to an active mode after the sleep mode. Operation information 314 from other components of system 200 may further include second start time Ts2 or the length of gap period Tg. Gap period Tg may be used in some circumstances to protect the victim IC (e.g., IC 234A) from repeated exposure to spurs. The aggressor IC (e.g., IC 234B) may include some operational modes with gap period Tg so that one of the degrees of freedom for the victim IC is for the aggressor IC to use gap period Tg that results in some compromise in performance but balances the performance of the victim systemic against exposure to sustained and damaging from spurs generated by the aggressor IC.

In one or more embodiments, timing information (e.g., start times, update times, lengths of intervals, and the length of gap period) in a message from IC 234B, application processor 208 or hub device 210 may be expressed in terms of global clock signal 244. After receiving the message, processor 312 of IC 234A may convert such timing information to timing information expressed in terms of local clock signal 248A and send revised operating information 314 to spur parameter generation circuit 344.

Spur parameter generation circuit 344 may also determine the relationships between local clocks 248A, 248B. Although nominal frequencies of local clocks 248A, 248B may be known, these frequencies may drift due to temperature/pressure changes or supply voltage variations. Hence, spur parameter generation circuit 344 periodically updates the relationships between the two local clocks 248A, 248B, and provide the updated relationships to spur cancellation circuits 348 as part of spur parameters 346 so that spur cancellation can be performed effectively despite the drift.

Figure 6:
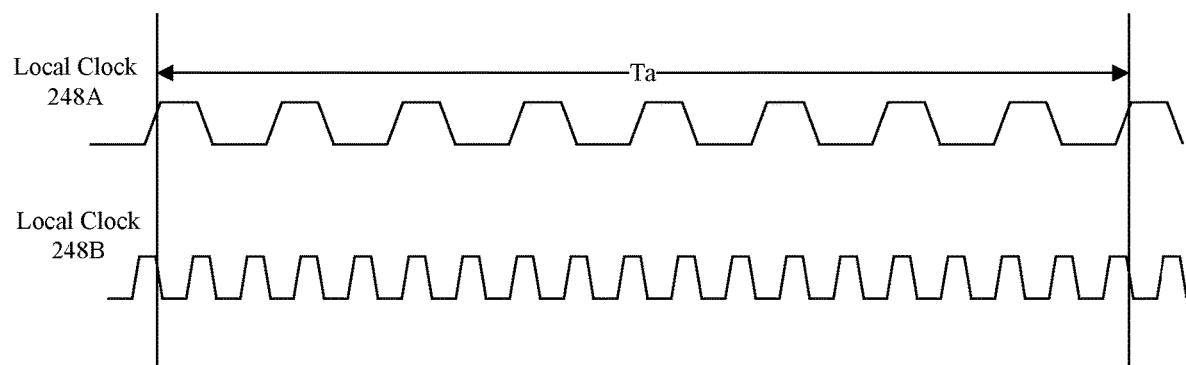
FIG. 6 is a signal diagram illustrating the relationships between local clock signals for the victim IC and the aggressor IC, according to one embodiment.

Because the frequencies of local clock signals 248A, 248B may drift over time due to various reasons, spur parameter generation circuit 344 further determines the relationships between local clock signals 248A, 248B. An example method of determining the relationship between the frequencies of two local clock signals 248A, 248B is described with reference to FIG. 6. FIG. 6 is a timing diagram of two local clock signals 248A, 248B, according to one embodiment. For a sample time Ts that may be defined as a predetermined number of cycles of local clock signal 248A, the number of cycles in local clock signal 248B is counted. One way of determining the number of cycles in local clock signal 248B is by counting the number of edges during sample time Ts. The edges for this purpose may be rising edges, falling edges or both. The count of edges in local clock signal 248A and the count of edges in local clock signal 248B over sample period time Ts are tallied by spur parameter generation circuit 344. Then, the relationships between the two local clock signals 248A, 248B are indicated as a ratio between the counts of the edges during sample time Tx. Such ratio may be updated continuously after each sampling time Ts or be updated periodically by spur parameter generation circuit 344. The ratio may be sent to spur cancellation circuits 348 as part of spur parameters 346.

When IC 234B starts with one or more operating frequencies at start time Ts1, spur parameter generation circuit 344 determines a ratio of clock counts at an initial time before start time Ts1 and sends it to the spur cancellation circuits 348 as spur parameter 346 to perform spur cancellation during the first interval RI0. Then, spur parameter generation circuit 344 updates the ratio of clock counts at a subsequent time before an update time (e.g., Tu1), and sends the updated ratio to spur cancellation circuits 348 as a subsequent spur parameter 346 to perform spur cancellation during a subsequent interval (e.g., RI1). Because the updated ratio at the subsequent time is closer to the actual ratio of frequencies of the two local clocks during the subsequent interval (e.g., RI1) than the initial ratio determined at the initial time, spur cancellation circuits 348 may perform more effective spur cancellation in the subsequent interval by using the more accurate ratio.

Example Using Reference Signal to Determine Local Clock Relationships

Figure 7:
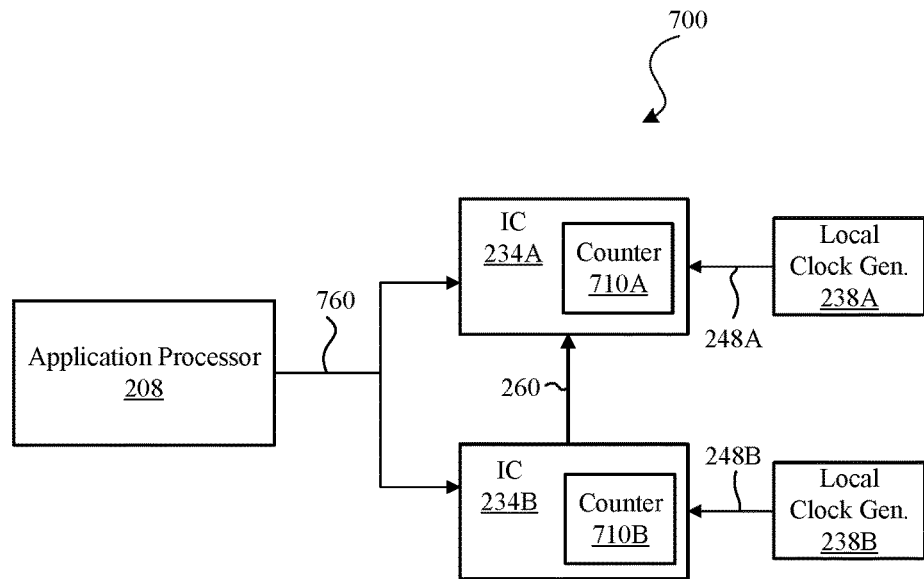
FIG. 7 is a block diagram of a system that uses a reference signal to determine relationships between local clock signals for the victim IC and the aggressor IC, according to one embodiment.

Instead of having spur parameter generation circuit 344 count the edges of both local clock signals 248A, 248B, reference signal 760 may be used to have IC 234A and IC 234B count the edges of their own local clock signals 248A, 248B for the same duration. FIG. 7 is a block diagram of system 700 that uses reference signal 760 to determine relationships between two local clock signals 248A, 248B, according to one embodiment. Similar to the embodiment of FIG. 2, local clock generation circuits 238A, 238B generate local clock signals 248A, 248B, respectively in the embodiment of FIG. 2. However, unlike the embodiment of FIG. 2, application processor 208 sends reference signal 760 to both ICs 234A, 234B, and IC 234A receives only local clock signal 248A but not local clock signal 248B in the embodiment of FIG. 7.

ICs 234A, 234B include counters 710A, 710B, respectively. Counter 710A counts edges in local clock signal 248A while counter 710B counts edges in local clock signal 248B according to trigger signals derived from reference signal 760. In one or more embodiments, the trigger signals may be generated at ICs 234A, 234B when rising edges or falling edges of reference signal 760 are detected.

Figure 8:
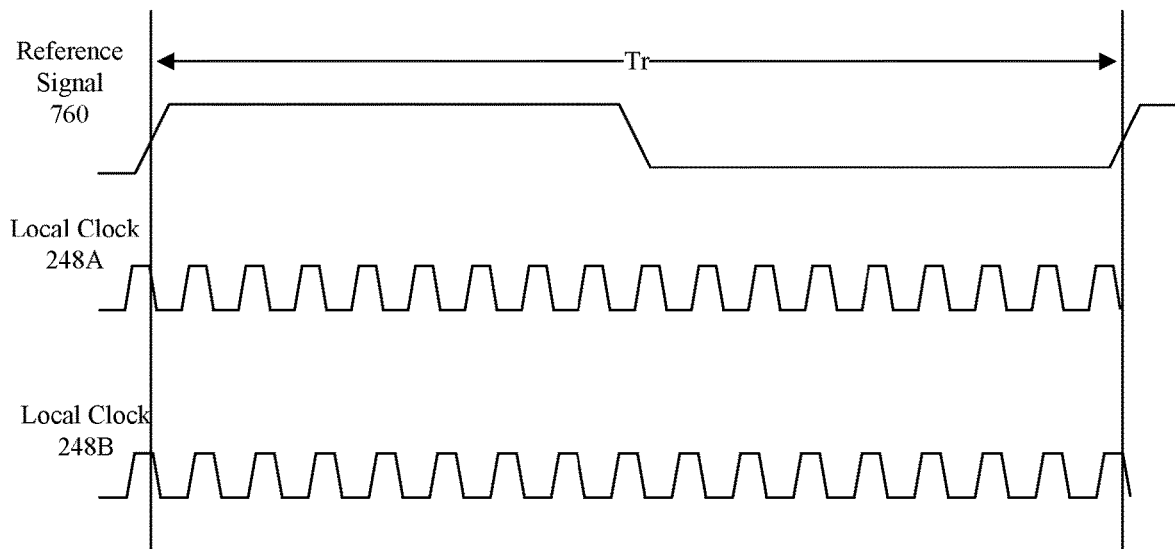
FIG. 8 is a timing diagram illustrating a reference signal and local clock signals, according to one embodiment.

FIG. 8 is a timing diagram illustrating counting of edges in local clock signals 248A, 248B over reference period Tr, according to one embodiment. In the example of FIG. 8, the reference period Tr may be a single cycle of reference signal 760. In other examples, reference period Tr may be multiple clock cycles or a fraction of a single clock cycle of reference signal 760. During reference period Tr, counters 710A, 710B tally the number of edges detected in local clock signals 248A, 248B, respectively. The same period Tr may be defined by the trigger signal generated by ICs 234A, 234B.

Then, IC 234B may send its count of the edges in local clock signal 248B over reference period Tr to IC 234A over P2P connection 260 or multi-drop bus 220. Spur parameter generation circuit 344 in IC 234A may receive the counts of edges from counters 710A, 710B and determine the ratio of the counts to be sent to spur cancellation circuits 348 as a spur parameter.

The embodiment of FIG. 7 obviates the need for IC 234A to receive local clock signal 248B and may simplify operations at IC 234A to determine the ratio of local clock frequencies. In other embodiments, reference local signal 760 may be provided by a separate clock generation circuit instead of being provided by application processor 208.

Example of Using Protection Information

As briefly described above with reference to FIG. 3, protection prioritizer 320 of IC 234A generates protection information for sending to IC 234B. For this purpose, protection prioritizer 320 analyzes the operating states of communication subsystems 336 and prioritizes frequency bands based on one or more factors. After analyzing, the protection prioritizer 320 generates the protection information that lists frequency bands to be protected and priority of these frequency bands as determined by prioritizer 320.

FIG. 9 is a diagram illustrating fields in the protection information generated by protection prioritizer 320, according to one embodiment. The protection information lists a number of frequency bands to be protected and their corresponding priority. The frequency band at the top of the protection information has the highest priority whereas the frequency bands in the lower portions of the protection information have lower priority.

The protection information may also include other information such as types of data being transmitted by certain bands of frequencies, signal strength of signals transmitted over the frequencies, active/inactive states of communication subsystems 338, frequency range to protect per carrier, and a priority related to the importance of the carrier for functional operation of the cellular link (e.g., whether the link is used for data communication or to monitor for possible reselection). This is merely an example, and various other types of information may be included in the protection information.

The generated protection information may be sent to IC 234B and other potential aggressor ICs in system 200 over a channel (e.g., P2P connection 260 or multi-drop bus 220). The protection information may be sent to buffer 212 of hub device 210 for storage and retrieval by other ICs in system 200 that may become aggressor ICs. In this way, ICs that are placed in a sleep mode during transmission of the protection information may still retrieve the protection information from buffer 212 after they wake up from the sleep mode.

The protection information is received by subsystem controller 420 of IC 234B. After receiving the protection information, subsystem controller 420 may determine the operating frequencies of one or more of subsystems 436. In one or more embodiments, subsystem controller 420 searches operating frequencies useable by subsystems 436 but that do not fall under frequency bands listed in the protection information. If not all protected operating frequencies are avoidable, subsystem controller 420 may prioritize avoiding frequency bands of higher priority. In other embodiments, subsystem controller 420 may use its own algorithm to determine the frequency bands to be avoided which may use additional information not available to IC 234A, instead of relying solely on the priority of frequency bands listed in the protection information. Subsystem controller 420 may determine that transmission of certain types of data by IC 234A over a frequency band of a lower priority (as identified, for example, in the "other data" field of the protection information) is more important than data transmitted by frequency bands of higher priorities (as identified, for example, in the priority fields of the protection information); and hence, prioritize protecting the frequency bands for carrying the certain types of data. Subsystem controller 420 may also receive instructions or requests from application processor 208 or other ICs (e.g., IC 234N) to prioritize certain frequency bands. Subsystem controller 420 may take into account such instructions or requests to determine the operating frequencies of subsystem controller 420.

After determining operating frequencies and other configuration of subsystem controller 420, subsystem controller 420 sends configuration instructions to configure the operation of subsystems 436.

Such use of the priority information may be in addition to or in lieu of spur cancellation performed at a victim IC (e.g., IC 234A). By avoiding certain frequency bands pursuant to protection information from a victim IC in the same system, an increased number of ICs may be included in the system while reducing interference between the ICs.

Example Method of Preventing Spur Interference

Figure 10:
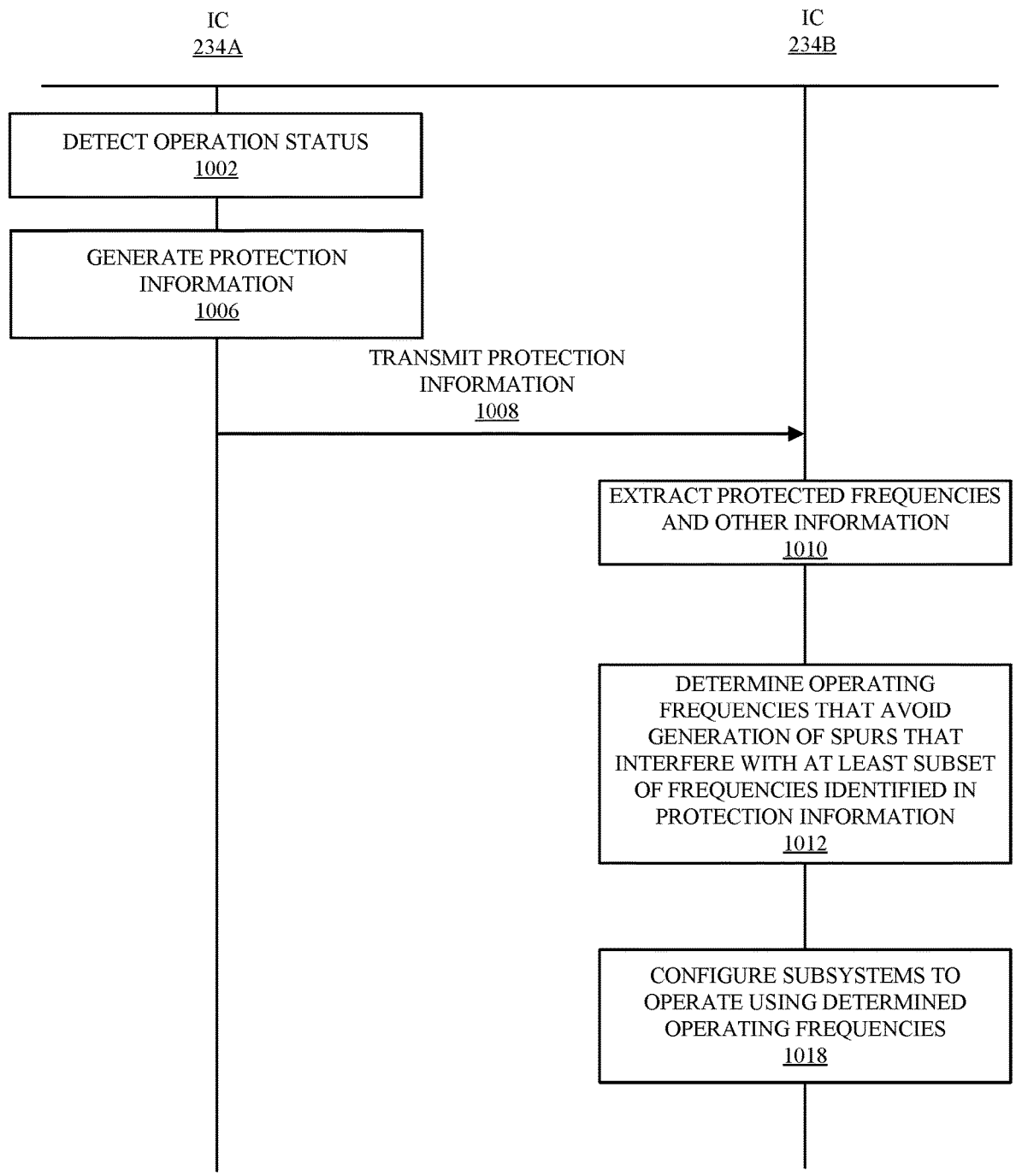
FIG. 10 is an interaction diagram between the victim IC and the aggressor IC, according to one embodiment.

FIG. 10 is an interaction diagram illustrating a process of configuring IC 234B using protection information from IC 234A, according to one embodiment. In the above example described above with reference to FIG. 10, the victim IC is IC 234A and the aggressor IC is IC 234B.

IC 234A determines 1002 its operating status. The operating status may include, for example, which communication subsystems 336 are active or inactive, types of data transmitted using certain frequencies, and the signal strength associated with each communication systems. Based on the operating status, IC 234A generates 1006 protection information. The protection information may also indicate priority of frequency bands to be protected in addition to other information derived from the operating status. In one or more embodiments, IC 234A may take into account characteristics of spurs generated by IC 234B or other operational characteristics of IC 234B, in addition to its own operating status, to generate the protection information.

The protection information is then transmitted from IC 234A to IC 234B. The protection information may be sent over various communication channels such as a point-to-point connection or a multi-drop bus.

After receiving the protection information, IC 234B extracts 1010 frequency bands to be protected and other information relevant for determining its operating frequencies. If IC 234B identifies its operation frequencies that can avoid interferences of all protected frequency bands, these operation frequencies may be chosen.

If IC 234B cannot identify operation frequencies that can avoid interference of all protected frequency bands, then IC 234B selects operating frequencies that avoid interference of prioritized frequency bands or reduces the exposure risk by having only one spur impact that frequency range, if possible. The frequency range may be chosen to also protect only critical control information sent by the network to IC 234A so that essential functionality of IC 234A is maintained. This control for certain frequencies can be changed dynamically to avoid the spurs impacting the same frequency ranges for an extended time. The priority for such selection may be compliant with the priority as identified in the priority information. Alternatively, various factors other than the priority identified in the protection information may be used to prioritize the protected frequencies. When the operation frequencies are determined to avoid interference with only selected protected frequency bands, interference with unselected protected bands may occur. For example, if a particular frequency range is being used as part of a voice call by IC 234A, such use of the frequency range may be used as additional context to prefer one frequency region to be protected over another.

IC 234B configures 1018 its subsystems to operate using the determined operating frequencies.

As operations of its subsystems dynamically change, IC 234B may continue to determine updated operating frequencies of its subsystems and update the subsystems according to the newly determined operating frequencies. Further, IC 234B may receive protection information from ICs other than IC 234A and determine new operating frequencies that avoid interference with the operations of IC 234B and the other ICs.

IC 234B may also receive updated protection information indicating changes in the operating status of IC 234A. For example, IC 234A may determine that the signal strengths of a frequency band dropped below a threshold, in which case, IC 234A may update the protection information to priority the frequency band with lower signal strengths and send the updated protection to IC 234B. In such case, IC 234B may repeat the process of determining 1012 updated operating frequencies of its subsystems based on the updated protection information, and configure 1018 its subsystems to operate with the updated operating frequencies. The updating of the protection information may performed dynamically at a practical rate to limit the impact on IC 234A. For example, if some frequency ranges are persistently exposed to spurs, then another operating set of parameters may be used by IC 234B to enable IC 234A to maintain its communication link.

The processes and the sequence of the processes described above with reference to FIG. 10 are merely illustrative and various change may be made. For example, the protection information may be generated and transmitted from an IC other than IC 234A (e.g., application processor 208). In such case, IC 234B may execute an algorithm to determine which frequencies for which ICs to be protected with higher priority. That is, IC 234B may take into account different protection information received from different source ICs to determine operating frequencies of IC 234B.

Alternative Embodiments

Although in the above embodiments, the operation information such as the start/update time and the operating frequencies are described as being provided by the aggressor IC (e.g., IC 234B), the same information may be provided by application processor 208 instead of the aggressor IC. In alternative embodiments, the aggressor IC may have limited capability and may not generate or send the operation information to a victim IC. In such embodiments, another IC such as application processor 208 may handle such operations and provide the operation information to the victim IC instead of the aggressor IC.

Further, above embodiments are described using an example where only one aggressor IC (e.g., IC 234B) generates spurs for a victim IC (e.g., IC 248A). However, the same principle may be applied to cases where a victim IC receives spurs from multiple aggressor ICs. In such cases, the victim IC may determine relationships between its local clock signal and local clock signals of multiple aggressor ICs, and receive operation information from multiple aggressor ICs. The victim IC may then perform spur cancellation to mitigate or cancel the spurs from multiple aggressor ICs.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A method of protecting a first integrated circuit (IC) from spurs generated by a second IC, comprising:
    operating a circuit component in the second IC with a repeating sequence of operating intervals, the operating of the circuit component generating the spurs;
    receiving operation information indicative of the repeating sequence by the first IC;
    generating, by the first IC, a spur parameter indicative of times at which subsequent ones of the operating intervals are estimated to start by processing the operation information; and
    operating a spur cancellation circuit in the first IC to mitigate or remove the spurs using the spur parameter.

2. The method of claim 1, wherein lengths of the operating intervals are variable, and the spur parameter is further indicative of update times at which operating frequencies of the second IC are updated or further indicative of the varying lengths of the operating intervals.

3. The method of claim 1, wherein the operating information is transmitted over a multi-drop bus coupled to the first IC and the second IC.

4. The method of claim 1, wherein the operating information is received by the first IC transmitted over a plurality of messages to the first IC.

5. The method of claim 1, wherein the operating information is received from a third IC separate from the first IC and the second IC, the third IC configured to coordinate operations of the first IC and the third IC.

6. The method of claim 5, wherein the operating information is received over a point-to-point communication between the first IC and the third IC.

7. The method of claim 1, wherein the operating information is further indicative of a gap period during which the second IC is inactive.

8. The method of claim 1, wherein timing information in the operating information is expressed in terms of a global clock.

9. The method of claim 1, further comprising determining relationships between a first local clock signal provided to the first IC and a second local signal provided to the second IC, wherein the relationships are provided to the spur cancellation circuit to mitigate or remove the spurs.

10. A first integrated circuit (IC), comprising:
    an interface circuit configured to receive operation information indicative of a repeating sequence of operations of a second IC having a repeating sequence of operating intervals, operating of a circuit component in the second IC generating spurs;
    a spur parameter generation circuit coupled to the interface circuit, the spur parameter generation circuit configured to generate a spur parameter indicative of times at which subsequent ones of the operating intervals are estimated to start by processing the operation information; and
    a spur cancellation circuit coupled to the spur parameter generation circuit, the spur cancellation circuit configured to mitigate or remove the spurs using the spur parameter.

11. The first IC of claim 10, wherein lengths of the operating intervals are variable, and the spur parameter is further indicative of update times at which operating frequencies of the second IC are updated or further indicative of the varying lengths of the operating intervals.

12. The first IC of claim 10, wherein the interface circuit is configured to communicate over a multi-drop bus.

13. The first IC of claim 10, wherein the operating information is received by the first IC over a plurality of messages.

14. The first IC of claim 10, wherein the operating information is received from a third IC separate from the first IC and the second IC, the third IC configured to coordinate operations of the first IC and the third IC.

15. The first IC of claim 14, wherein the interface circuit is configured to communicate over a point-to-point communication with the third IC.

16. The first IC of claim 10, wherein the operating information is further indicative of a gap period during which the second IC is inactive.

17. The first IC of claim 10, wherein timing information in the operating information is expressed in terms of a global clock.

18. The first IC of claim 10, wherein the spur parameter generation circuit is further configured to determine relationships between a first local clock signal provided to the first IC and a second local signal provided to the second IC, wherein the relationships are provided to the spur cancellation circuit to mitigate or remove the spurs.

\* \* \* \* \*

UNITED STATES PATENT AND TRADEMARK OFFICE
CERTIFICATE OF CORRECTION

PATENT NO. : 11,777,479 B2
APPLICATION NO. : 17/977191
DATED : October 3, 2023
INVENTOR(S) : O'Shea et al.

It is certified that error appears in the above-identified patent and that said Letters Patent is hereby corrected as shown below:

In the Specification

In Column 1, Line 60, delete "(FIG. 1" and insert -- (FIG.) 1 --, therefor.

In Column 3, Line 24, delete "(FIG. 1" and insert -- (FIG.) 1 --, therefor.

Signed and Sealed this
Seventh Day of November, 2023

Katherine Kelly Vidal
*Director of the United States Patent and Trademark Office*